US012296594B2

(12) United States Patent
Inoue et al.

(10) Patent No.: US 12,296,594 B2
(45) Date of Patent: May 13, 2025

(54) METHOD OF CONTROLLING A LIQUID EJECTING DEVICE AND LIQUID EJECTING DEVICE

(71) Applicant: SEIKO EPSON CORPORATION, Tokyo (JP)

(72) Inventors: Ken Inoue, Shiojiri (JP); Tomoki Shinoda, Shiojiri (JP); Shunsuke Kuramata, Shiojiri (JP); Masaaki Ando, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 144 days.

(21) Appl. No.: 18/171,877

(22) Filed: Feb. 21, 2023

(65) Prior Publication Data

US 2023/0264476 A1 Aug. 24, 2023

(30) Foreign Application Priority Data

Feb. 21, 2022 (JP) ................................ 2022-024532
Feb. 24, 2022 (JP) ................................ 2022-026715

(51) Int. Cl.
*B41J 2/165* (2006.01)
*B41J 29/393* (2006.01)

(52) U.S. Cl.
CPC ....... *B41J 2/16544* (2013.01); *B41J 2/16526* (2013.01); *B41J 2/16579* (2013.01); *B41J 29/393* (2013.01); *B41J 2002/1655* (2013.01); *B41J 2002/1657* (2013.01)

(58) Field of Classification Search
CPC ................ B41J 2/16544; B41J 2/16526; B41J 2002/1655
See application file for complete search history.

(56) References Cited

U.S. PATENT DOCUMENTS 6,299,278 B1 * 10/2001 Hanabusa ............ B41J 2/16544 347/23
9,114,618 B2 * 8/2015 Murayama ........... B41J 2/16535
2019/0263127 A1 8/2019 Tanioku

FOREIGN PATENT DOCUMENTS

JP 2019-147289 A 9/2019

* cited by examiner

*Primary Examiner* — Sharon Polk
(74) *Attorney, Agent, or Firm* — WORKMAN NYDEGGER

(57) ABSTRACT

Provided is a method of controlling a liquid ejecting device. The liquid ejecting device includes a liquid ejecting unit configured to eject a liquid containing an inorganic pigment from a nozzle provided at a nozzle surface, a wiper unit including a band-like member configured to absorb the liquid and a pressing unit configured to move the band-like member in a first direction, and a wiper moving unit configured to move the wiper unit in a second direction opposite to the first direction to wipe the nozzle surface using the band-like member. The method includes performing first wiping in which, to wipe the nozzle surface, the wiper moving unit moves the wiper unit at a first velocity while the pressing unit moves the band-like member at a first velocity.

9 Claims, 7 Drawing Sheets

METHOD OF CONTROLLING A LIQUID EJECTING DEVICE AND LIQUID EJECTING DEVICE

The present application is based on, and claims priority from JP Application Serial Number 2022-024532 filed on Feb. 21, 2022 and 2022-026715 filed on Feb. 24, 2022, the disclosures of which are hereby incorporated by reference herein in its entirety.

BACKGROUND

1. Technical Field

The present disclosure relates to a method of controlling a liquid ejecting device and a liquid ejecting device.

2. Related Art

For example, as in JP-A-2019-147289, there is an inkjet recording device serving as one example of a liquid ejecting device including a recording head serving as one example of a liquid ejecting unit. The recording head ejects ink serving as one example of a liquid from a nozzle provided at a nozzle surface, thereby performing printing. The nozzle surface includes a nozzle-formed portion and a nozzle not-formed portion. The nozzle is formed in the nozzle-formed portion. The nozzle not-formed portion is disposed at the outside of the nozzle.

The inkjet recording device includes a wiper unit serving as one example of a wiper unit. The wiper unit includes a pressing member serving as one example of a pressing unit, and a wiping sheet serving as one example of a band-like member. The pressing member presses the wiping sheet against the nozzle surface. The wiper unit moves the wiping sheet in a state of being in contact with the nozzle surface, to wipe the nozzle surface.

The pressing member includes a recessed portion. That is, the pressing member is configured such that the diameter thereof at a portion where the wiping sheet is pressed against the nozzle-formed portion is smaller than the diameter thereof at a portion where the wiping sheet is pressed against the nozzle not-formed portion. With this configuration, the pressure acting on the nozzle-formed portion is smaller than the pressure acting on the nozzle not-formed portion.

When the band-like member is used to wipe the nozzle surface so as to rub and remove dirt attached on the nozzle surface, the nozzle surface may wear to deteriorate a liquid repellent property. The nozzle surface is more likely to wear when a liquid containing an inorganic pigment is attached on the nozzle surface. Thus, even when the recessed portion is provided at the pressing member as in JP-A-2019-147289, it is difficult to suppress the wear of the nozzle surface if the wiper unit is moved to wipe the nozzle surface in a state in which the wiping sheet is in contact with the nozzle surface.

SUMMARY

A method of controlling a liquid ejecting device is provided to solve the problem described above. The liquid ejecting device includes a liquid ejecting unit configured to eject a liquid containing an inorganic pigment from a nozzle provided at a nozzle surface, a wiper unit including a band-like member configured to absorb the liquid and a moving unit configured to move the band-like member in a first direction, and a wiper moving unit configured to move the wiper unit in a second direction opposite to the first direction to wipe the nozzle surface using the band-like member. The method includes performing first wiping in which, to wipe the nozzle surface, the wiper moving unit moves the wiper unit at a first velocity while the moving unit moves the band-like member at the first velocity.

A liquid ejecting device to solve the problem described above includes a liquid ejecting unit configured to eject a liquid containing an inorganic pigment from a nozzle provided at a nozzle surface, a wiper unit including a band-like member configured to absorb the liquid and a moving unit configured to move the band-like member in a first direction, a wiper moving unit configured to move the wiper unit in a second direction opposite to the first direction to wipe the nozzle surface using the band-like member, and a control unit configured to control the moving unit and the wiper moving unit. The control unit is configured to perform first wiping in which, to wipe the nozzle surface, the wiper moving unit moves the wiper unit at a first velocity while the moving unit moves the band-like member at the first velocity.

DESCRIPTION OF EXEMPLARY EMBODIMENTS

First Embodiment

Figure 1:
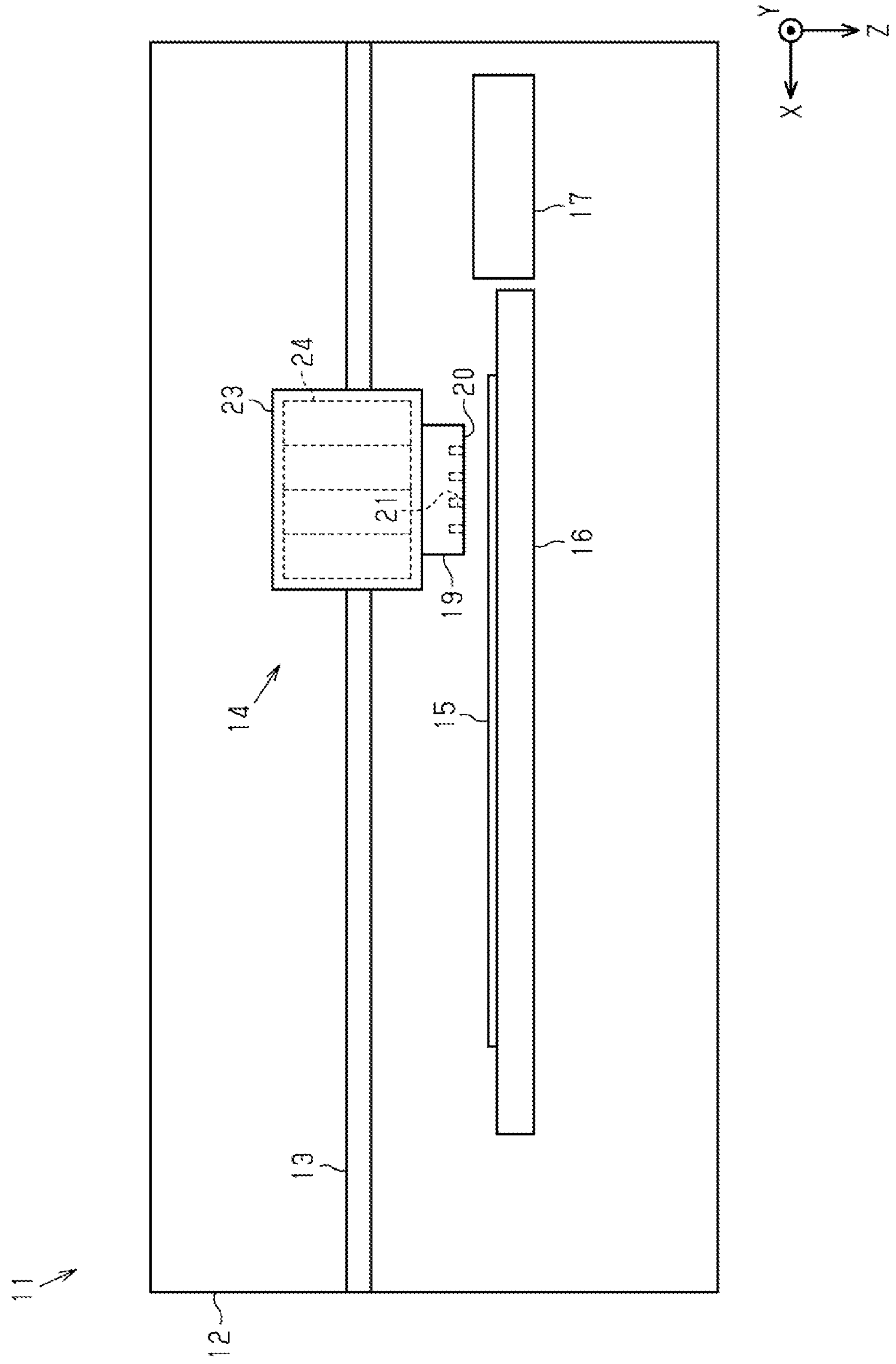
FIG. 1 is a schematic view of a first embodiment of a liquid ejecting device.

Below, embodiments of a liquid ejecting device and a method of controlling a liquid ejecting device will be described with reference to the drawings. The liquid ejecting device is, for example, a printer of an ink jet-type configured to eject ink serving as one example of a liquid on a medium such as a sheet, fabric, vinyl, a plastic component, a metal component, or the like.

In the drawings, on the assumption that the liquid ejecting device 11 is disposed on the horizontal plane, the Z-axis indicates a gravitational direction, and the X-axis and Y-axis each indicate a direction along the horizontal plane. The X-axis, the Y-axis, and the Z-axis intersect each other at right angles. In the following description, the width direction X represents a direction parallel to the X-axis, the depth direction Y represents a direction parallel to the Y-axis, and the vertical direction Z represents a direction parallel to the Z-axis.

Liquid Ejecting Device

As illustrated in FIG. 1, the liquid ejecting device 11 may include a housing 12, a guide shaft 13, and a printing unit 14. The liquid ejecting device 11 may include a medium support portion 16 configured to support the medium 15, and a maintenance unit 17.

The guide shaft 13 may be supported by the housing 12. The guide shaft 13 according to the present embodiment extends in the width direction X.

The printing unit 14 may be provided so as to be able to move along the guide shaft 13. The printing unit 14 includes a liquid ejecting unit 19. That is, the liquid ejecting device 11 includes the liquid ejecting unit 19. The liquid ejecting unit 19 is able to eject a liquid containing an inorganic pigment from a nozzle 21 provided at a nozzle surface 20. The liquid ejecting unit 19 according to the present embodiment is configured so as to be able to eject a first liquid and a second liquid. The first liquid is a liquid containing an inorganic pigment. The second liquid is a liquid not containing any inorganic pigment.

The printing unit 14 may include a carriage 23. The carriage 23 causes the liquid ejecting unit 19 to reciprocate along the guide shaft 13. The carriage 23 may move in a state of mounting a plurality of liquid accommodation bodies 24.

The liquid accommodation bodies 24 may be mounted at the carriage 23 in a detachable manner. The liquid accommodation bodies 24 may be filled with a liquid in advance, or may temporarily accommodate a liquid supplied from a supply source that is not illustrated. The liquid accommodated in the liquid accommodation bodies 24 is supplied to the liquid ejecting unit 19.

In the present embodiment, the liquid accommodation bodies 24 each accommodate a different type of liquid. When one liquid accommodation body 24 is able to accommodate a plurality of types of liquids, the carriage 23 may move in a state of mounting the single liquid accommodation body 24.

Liquid Ejecting Unit

Figure 2:
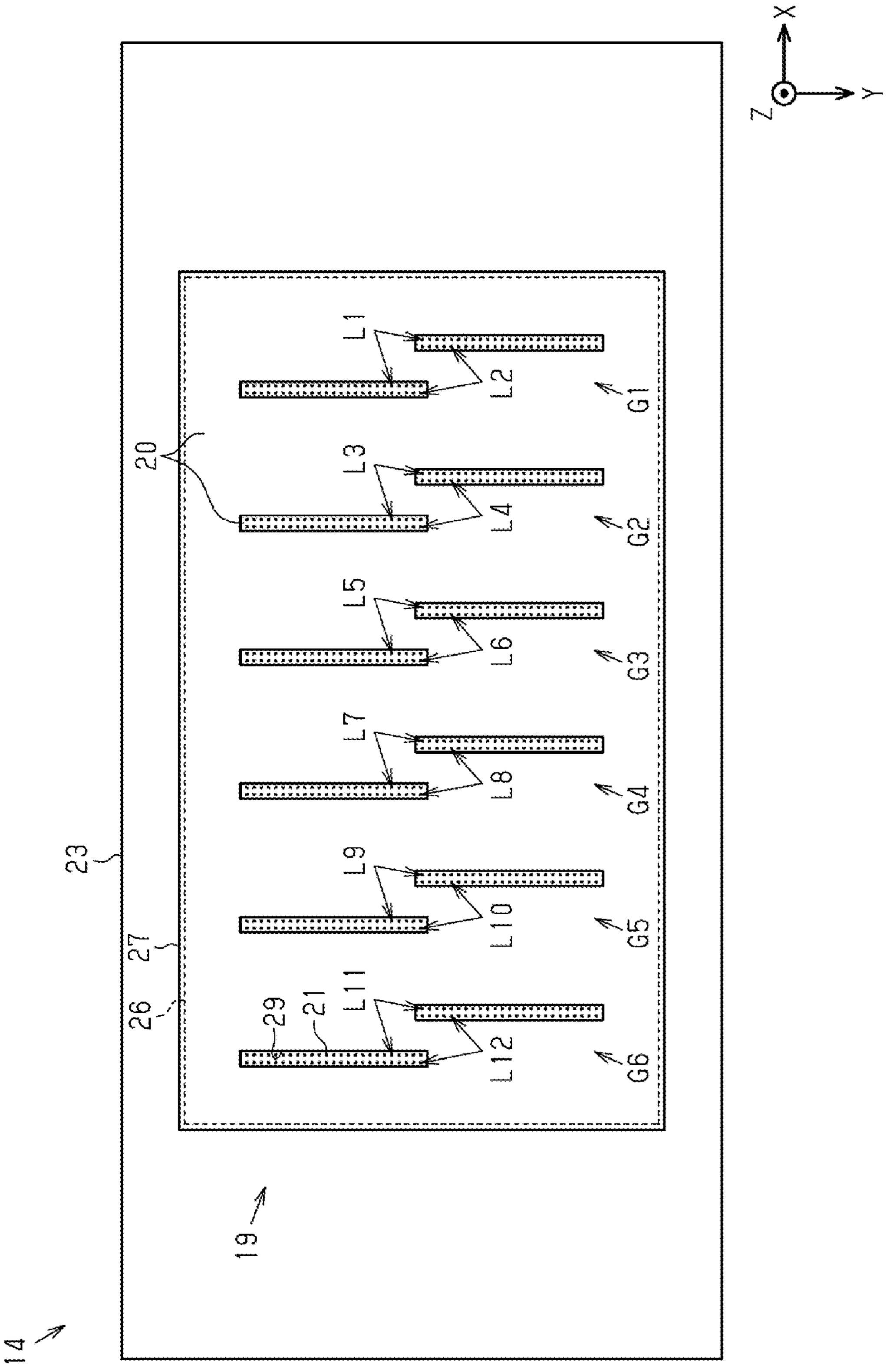
FIG. 2 is a bottom view illustrating a printing unit.

As illustrated in FIG. 2, the liquid ejecting unit 19 may include a nozzle formed member 26 and a cover member 27.

A plurality of nozzles 21 are formed in the nozzle formed member 26.

The cover member 27 covers a portion of the nozzle formed member 26. The cover member 27 is made, for example, of a metal such as stainless steel. The cover member 27 includes a plurality of through holes 29 formed so as to extend through the cover member 27 in the vertical direction Z. The cover member 27 covers a side of the nozzle formed member 26 where the opening of the nozzle 21 is formed, so as to expose the nozzle 21 from the through holes 29.

The nozzle surface 20 is formed so as to include the nozzle formed member 26 and the cover member 27. Specifically, the nozzle surface 20 is comprised of the nozzle formed member 26 exposed from the through holes 29, and the cover member 27.

In the liquid ejecting unit 19, a large number of openings of the nozzles 21 configured to eject the liquid are arranged at constant intervals in one direction. The plurality of nozzles 21 constitute a nozzle row. In the present embodiment, the nozzles 21 arranged in the depth direction Y constitute the first nozzle row L1 to the twelfth nozzle row L12. The plurality of nozzles 21 that constitute one nozzle row eject the same liquid. Of the nozzles 21 that constitute one nozzle row, nozzles 21 disposed at the far end in the depth direction Y and nozzles 21 disposed at the front in the depth direction Y are formed so as to be positionally shifted in the width direction X.

The first nozzle row L1 to the twelfth nozzle row L12 are arranged such that each two rows are close to each other in the width direction X. In the present embodiment, the two nozzle rows arranged close to each other are referred to as a nozzle group. In the liquid ejecting unit 19, the first nozzle group G1 to the sixth nozzle group G6 are arranged at constant intervals in the width direction X.

Specifically, the first nozzle group G1 includes the first nozzle row L1 and the second nozzle row L2. The second nozzle group G2 includes the third nozzle row L3 and the fourth nozzle row L4. The third nozzle group G3 includes the fifth nozzle row L5 and the sixth nozzle row L6. The fourth nozzle group G4 includes the seventh nozzle row L7 and the eighth nozzle row L8. The fifth nozzle group G5 includes the ninth nozzle row L9 and the tenth nozzle row L10. The sixth nozzle group G6 includes the eleventh nozzle row L11 and the twelfth nozzle row L12.

The liquid ejecting unit 19 according to the present embodiment ejects the first liquid from at least one nozzle row among the first nozzle row L1 to the twelfth nozzle row L12, and ejects the second liquid from the other nozzle row. For example, the first nozzle row L1 and the second nozzle row L2 may eject white ink serving as one example of the first liquid. For example, the third nozzle row L3 to the twelfth nozzle row L12 may eject black ink, gray ink, cyan ink, light cyan, cyan, magenta ink, light magenta ink, yellow ink, orange ink, and red ink, each of which serves as one example of the second liquid.

Maintenance Unit

Figure 3:
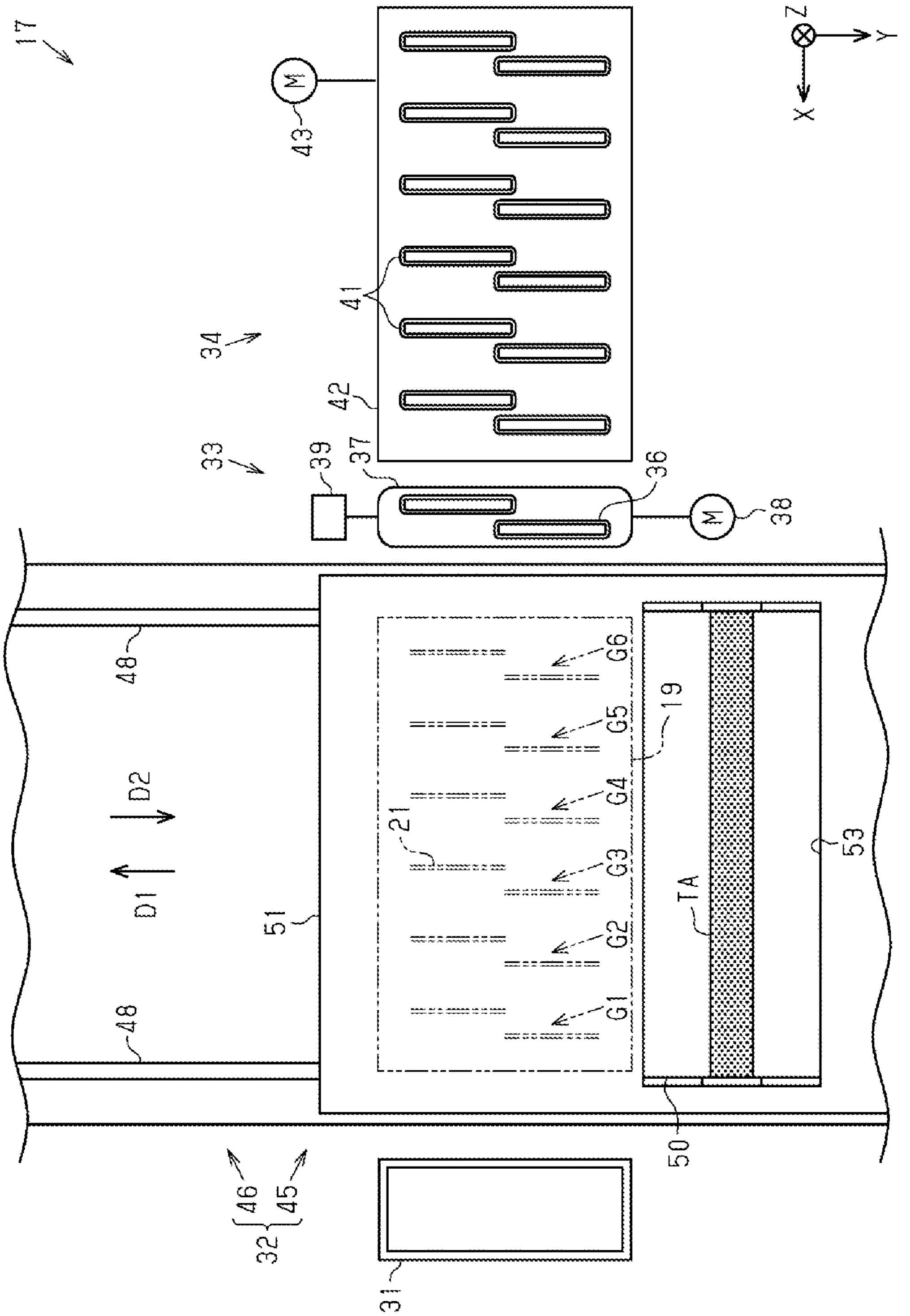
FIG. 3 is a plan view illustrating a maintenance unit.

As illustrated in FIG. 3, the maintenance unit 17 may include a liquid receiving portion 31, a wiping device 32, a forced discharge unit 33, and a capping device 34. In the present embodiment, the capping device 34, the forced discharge unit 33, the wiping device 32, and the liquid receiving portion 31 are arranged in the width direction X. In FIG. 3, the liquid ejecting unit 19 disposed above the wiping device 32 is illustrated with the long dashed double-short dashed line.

The liquid receiving portion 31 accommodates the liquid ejected from the liquid ejecting unit 19 through flushing. The flushing represents maintenance in which a liquid is ejected as a waste liquid for the purpose of preventing and sorting out clogging of the nozzles 21.

The forced discharge unit 33 may include a suction cap 36, a suction holding body 37, a suction motor 38, and a pressure reducing mechanism 39. The forced discharge unit 33 is able to perform forced discharge in which at least one of the first liquid or the second liquid is forcibly discharged from the nozzles 21. The forced discharge according to the present embodiment is also referred to as suction cleaning.

The suction holding body 37 holds the suction cap 36. The suction motor 38 causes the suction holding body 37 to reciprocate along the Z-axis. The pressure reducing mechanism 39 reduces pressures within the suction cap 36.

The suction cap 36 moves between a contact position and a retracting position in association with the movement of the suction holding body 37. The retracting position is a position where the suction cap 36 is spaced apart from the liquid ejecting unit 19. The contact position is a position where the suction cap 36 is brought into contact with the liquid ejecting unit 19 staying above the forced discharge unit 33. The suction cap 36 located at the contact position surrounds the nozzles 21. One suction cap 36 may be configured to collectively surround all the nozzles 21, or may be configured to surround at least one nozzle group, or may be surround a portion of the nozzles 21 among the nozzles 21 that constitute a nozzle group.

When one or a plurality of suction caps 36 collectively surround all the nozzles 21, the forced discharge unit 33 causes the first liquid and the second liquid to be collectively discharged. When one or a plurality of suction caps 36 collectively surround the nozzles 21 of a plurality of nozzle groups including a nozzle 21 in the first nozzle group G1, the forced discharge unit 33 causes the first liquid and the second liquid to be collectively discharged.

The forced discharge unit 33 according to the present embodiment performs the forced discharge for each of the nozzle groups. The forced discharge unit 33 according to the present embodiment is configured such that two suction caps 36 surround one nozzle group among the first nozzle group G1 to the sixth nozzle group G6. That is, the forced discharge unit 33 reduces pressures within the suction cap 36 that surrounds the first nozzle group G1 to forcibly discharge the first liquid. The forced discharge unit 33 reduces pressures within the suction cap 36 that surround any one nozzle group of the second nozzle group G2 to the sixth nozzle group G6, thereby causing the second liquid to be forcibly discharged.

The forced discharge unit 33 may perform the forced discharge to any one nozzle group among the first nozzle group G1 to the sixth nozzle group G6. The forced discharge unit 33 may perform the forced discharge to a plurality of nozzle groups from among the first nozzle group G1 to the sixth nozzle group G6.

The capping device 34 may include a standby cap 41, a standby holding body 42, and a standby motor 43.

The standby holding body 42 holds the standby cap 41. The standby motor 43 causes the standby holding body 42 to reciprocate along the Z-axis. The standby cap 41 moves between the capping position and the separation position in association with the movement of the standby holding body 42. The capping position is a position where the standby cap 41 is brought into contact with the liquid ejecting unit 19 staying above the capping device 34. The separation position is a position where the standby cap 41 is spaced apart from the liquid ejecting unit 19.

The standby cap 41 located at the capping position surrounds the openings of the nozzles 21 that constitute the first nozzle group G1 to the sixth nozzle group G6. The maintenance in which the standby cap 41 surrounds the opening of the nozzle 21 in this manner is referred to as standby capping. The standby capping is one type of capping. Through the standby capping, it is possible to suppress drying of the nozzle 21.

One standby cap 41 may be configured to collectively surround all the nozzles 21, or may be configured to surround at least one nozzle group, or may be configured to surround a portion of the nozzles 21 among the nozzles 21 that constitute a nozzle group. The capping device 34 according to the present embodiment is configured such that a plurality of standby caps 41 collectively surround all the nozzles 21.

Wiping Device

As illustrated in FIG. 3, the wiping device 32 may include a wiper unit 45 and a wiper moving unit 46.

The wiper moving unit 46 may include a rail 48. The wiper moving unit 46 according to the present embodiment includes a pair of rails 48. The pair of rails 48 extend along the Y-axis. The wiper moving unit 46 causes the wiper unit 45 to reciprocate along the rails 48. Specifically, the wiper moving unit 46 causes the wiper unit 45 to move in a first direction D1 and a second direction D2 that is opposite to the first direction D1. In the present embodiment, the first direction D1 and the second direction D2 are directions parallel to the Y-axis.

The wiper unit 45 includes a band-like member 50. The wiper unit 45 may include a case 51.

The band-like member 50 is able to absorb the first liquid and the second liquid. The band-like member 50 is configured such that a portion thereof disposed at a contact region TA hatched in FIG. 3 is able to be brought into contact with the liquid ejecting unit 19. In the first direction D1 and the second direction D2, the size of the contact region TA is smaller than the size of the nozzle surface 20.

The case 51 may accommodate the band-like member 50. The case 51 may include an opening portion 53. The opening portion 53 exposes a portion of the band-like member 50 that includes the contact region TA. In the width direction X, the size of the band-like member 50 may be greater than the size of the nozzle surface 20. In this case, it is possible to efficiently perform the maintenance of the liquid ejecting unit 19.

Figure 4:
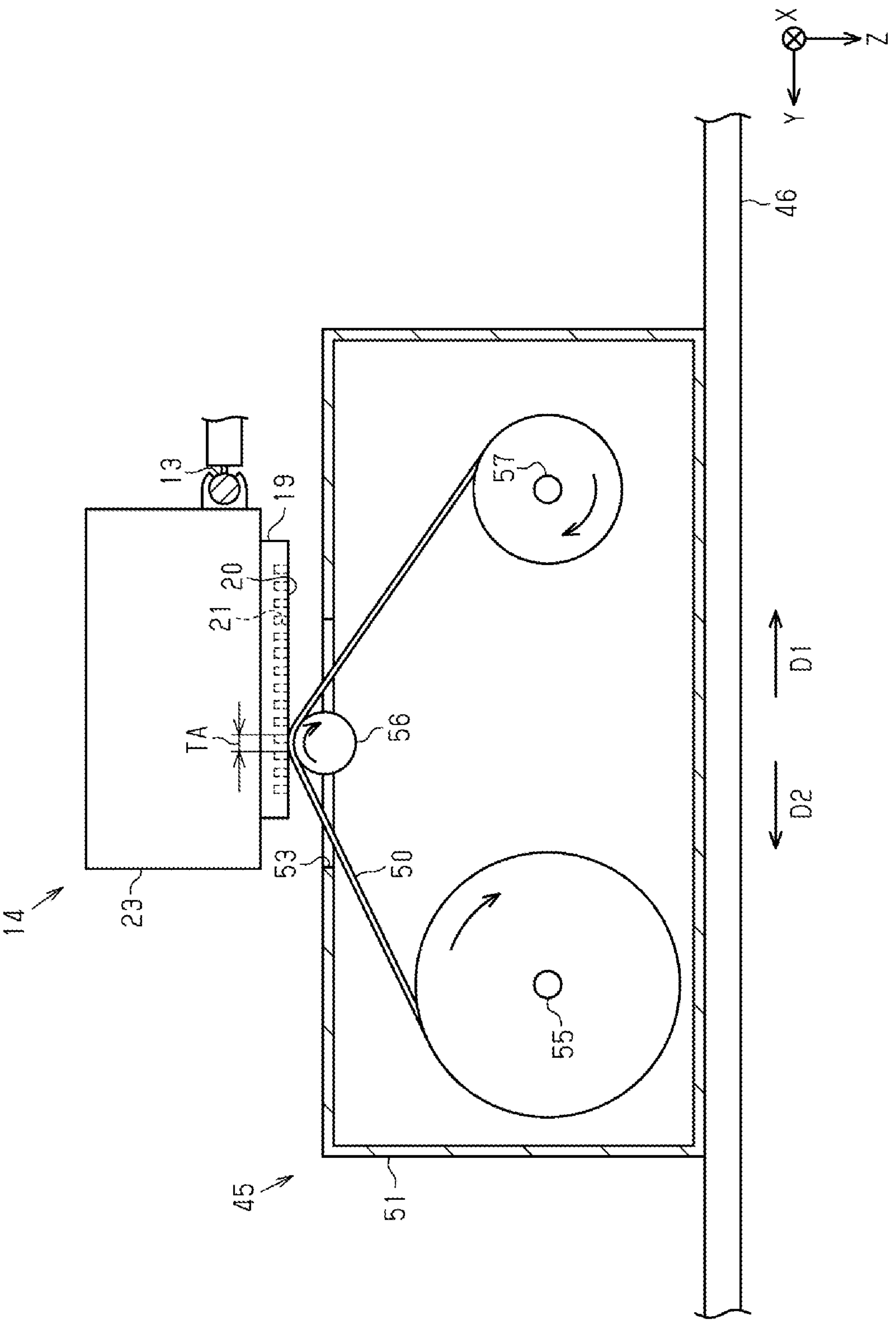
FIG. 4 is a schematic view illustrating the printing unit and a wiper unit.

As illustrated in FIG. 4, the wiper unit 45 may include a feeding unit 55, a pressing unit 56 serving as one example of a moving unit, and a winding unit 57. In the first direction D1, the winding unit 57 is disposed more forward than the feeding unit 55. In the first direction D1, the pressing unit 56 is disposed between the feeding unit 55 and the winding unit 57.

The feeding unit 55 holds the band-like member 50 in a rolled state. The feeding unit 55 rotatably holds the band-like member 50 wound in a roll form. The feeding unit 55 rotates to unwind the band-like member 50 and feed it. The band-like member 50 fed from the feeding unit 55 is passed around the pressing unit 56. The winding unit 57 winds, in a roll form, the band-like member 50 transferred through the pressing unit 56.

The pressing unit 56 is pressed upward, for example, with a spring that is not illustrated. The pressing unit 56 presses, against the nozzle surface 20, the band-like member 50 between the feeding unit 55 and the winding unit 57. The pressing unit 56 presses a portion of the band-like member 50 that is disposed at the contact region TA, thereby pressing the band-like member 50 against the nozzle surface 20. In other words, in a path used for the band-like member 50 to travel, a region disposed between the pressing unit 56 and the nozzle surface 20 is the contact region TA.

The feeding unit 55, the pressing unit 56, and the winding unit 57 may rotate with the power transmitted from a drive source that is not illustrated. The pressing unit 56 according to the present embodiment rotates to send the band-like member 50 from the feeding unit 55 to the winding unit 57. Specifically, the pressing unit 56 sends, in the first direction D1, a portion of the band-like member 50 that is disposed at the contact region TA. The pressing unit 56 according to the present embodiment functions as a moving unit that causes the band-like member 50 to move in the first direction D1.

Electrical Configuration

Figure 5:
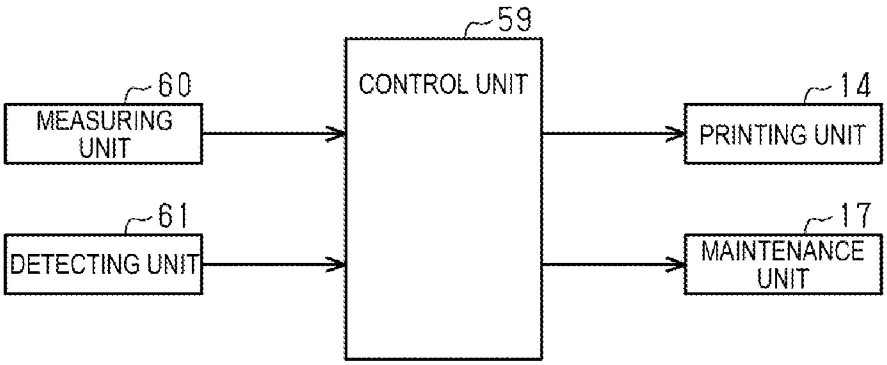
FIG. 5 is a block diagram illustrating the liquid ejecting device.

As illustrated in FIG. 5, the liquid ejecting device 11 includes a control unit 59. The liquid ejecting device 11 may include a measuring unit 60 and a detecting unit 61.

The control unit 59 controls various components of the liquid ejecting device 11 that include the printing unit 14, the maintenance unit 17, and the like. The control unit 59 also controls the pressing unit 56 and the wiper moving unit 46.

The control unit 59 may be configured as: a: one or more processors that perform various types of processes in accordance with a computer program; one or more dedicated hardware circuits such as an integrated circuit for a specific application, which performs at least a portion of processing among various types of processes; and y: a combination thereof. The processor includes a CPU and a memory such as RAM and ROM, and the memory stores a program code or a command configured to cause the CPU to perform the process. The memory, that is, a computer readable medium includes all kinds of readable media accessible by a general purpose or dedicated computer.

The measuring unit 60 measures the elapsed time from the wiping of the nozzle surface 20 by the wiper unit 45. For example, the measuring unit 60 may reset the measured time every time the wiping is performed, and set the measured time as the elapsed time.

The detecting unit 61 is able to detect the amount of dirt on the nozzle surface 20. For example, the detecting unit 61 may be an imaging element configured to take an image of the nozzle surface 20. The detecting unit 61 may analyze the taken image to obtain the amount of dirt on the nozzle surface 20. The taken image may be analyzed by the control unit 59.

The detecting unit 61 may be a counter configured to count the number of drops of the liquid ejected from the nozzles 21. The liquid ejected from the nozzles 21 may partially spread to turn into a fog-like mist. The mist attached on the nozzle surface 20 causes the nozzle surface 20 to get dirty. The amount of mist attached on the nozzle surface 20 increases with increase in the number of drops of the liquid ejected from the nozzles 21. Thus, the detecting unit 61 may detect the amount of dirt on the nozzle surface 20 by counting the number of drops of the liquid ejected from the nozzles 21.

Wiping Routine

A controlling method will be described with reference to the flowchart shown in FIG. 6. This wiping routine is performed at timing when the power supply is given to the liquid ejecting unit 19.

Figure 6:
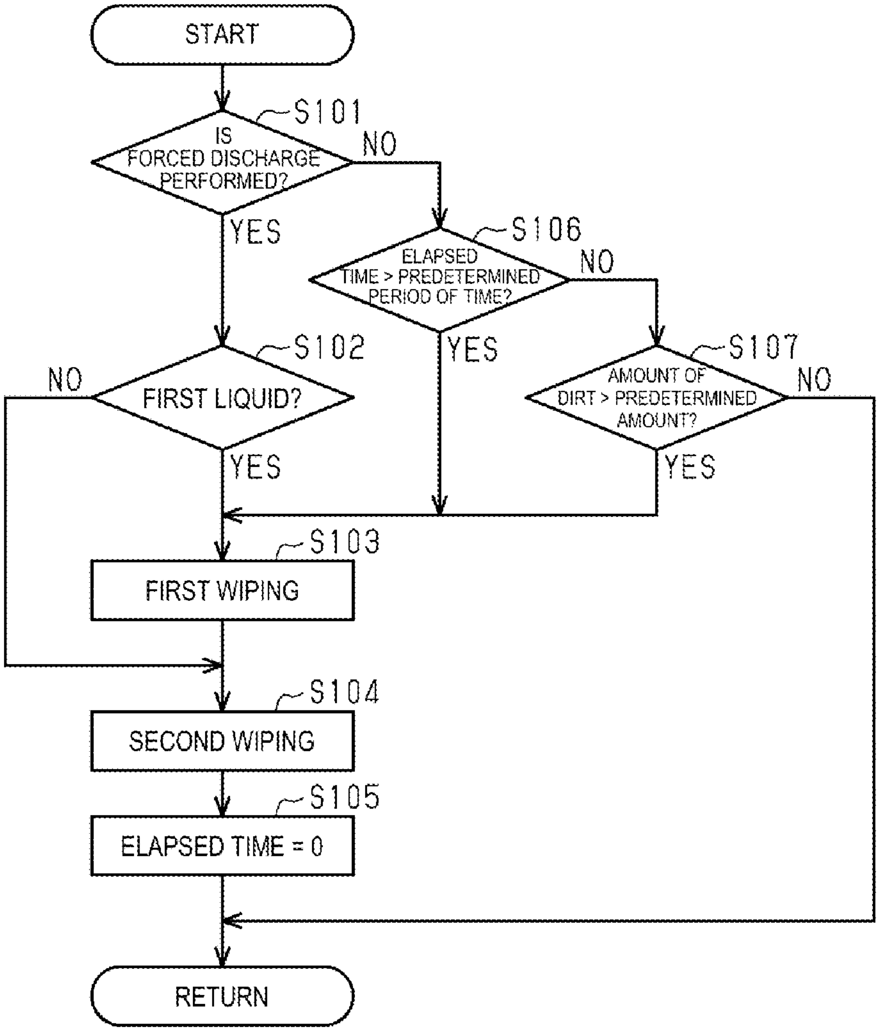
FIG. 6 is a flowchart illustrating a wiping routine.

As illustrated in FIG. 6, in step S101, the control unit 59 determines whether or not the forced discharge unit 33 performs the forced discharge. When the forced discharge is performed, step S101 results in YES, and the control unit 59 moves the process to step S102. In step S102, the control unit 59 determines whether or not the first liquid is discharged from the nozzles 21 in the forced discharge.

When the first liquid is not discharged from the nozzles 21 in the forced discharge, step S102 results in NO, and the control unit 59 causes the process to move to step S104.

When the first liquid is discharged from the nozzles 21 in the forced discharge, step S102 results in YES, and the control unit 59 causes the process to move to step S103. In step S103, the control unit 59 performs first wiping. In step S104, the control unit 59 performs second wiping. In step S105, the control unit 59 resets the elapsed time measured by the measuring unit 60, and the process moves to step S101.

When the forced discharge is not performed in step S101, step S101 results in NO, and the control unit 59 moves the process to step S106.

In step S106, the control unit 59 determines whether or not the elapsed time that has passed since the nozzle surface 20 is wiped exceeds a predetermined period of time. The predetermined period of time may be stored in the control unit 59 in advance, or may be set by a user.

When the elapsed time exceeds the predetermined period of time, step S106 results in YES, and the control unit 59 moves the process to step S103. When the elapsed time does not exceed the predetermined period of time, step S106 results in NO, and the control unit 59 moves the process to step S107.

In step S107, the control unit 59 determines whether or not the amount of dirt on the nozzle surface 20 exceeds a predetermined amount. The predetermined amount may be stored in the control unit 59 in advance, or may be set by a user.

When the amount of dirt on the nozzle surface 20 exceeds the predetermined amount, step S107 results in YES, and the control unit 59 moves the process to step S103. When the amount of dirt on the nozzle surface 20 does not exceed the predetermined amount, step S107 results in NO, and the control unit 59 moves the process to step S101.

First Wiping

As illustrated in FIG. 4, the first wiping is wiping in which the band-like member 50 is moved so as to correspond to the movement of the wiper unit 45. The direction in which the wiper unit 45 is moved in the first wiping is a direction opposite to a direction in which the band-like member 50 is moved. The wiper moving unit 46 moves the wiper unit 45 in the second direction D2 to wipe the nozzle surface 20 with the band-like member 50. The pressing unit 56 causes the band-like member 50 to move in the first direction D1 that is opposite to the second direction D2 where the pressing unit 56 itself moves. During the first wiping being performed, a portion of the band-like member 50 that is located at the contact region TA and is brought into contact with the nozzle surface 20 sequentially changes.

The control unit 59 performs the first wiping in which the nozzle surface 20 is wiped by causing the pressing unit 56 to move the band-like member 50 at a first velocity while causing the wiper moving unit 46 to move the wiper unit 45 at the first velocity. The first velocity at which the pressing unit 56 causes the band-like member 50 to move is substantially the same as the velocity at which the band-like member 50 itself moves. There may exist an error between the velocity at which the pressing unit 56 causes the band-like member 50 to move and the velocity at which the wiper moving unit 46 causes the wiper unit 45 to move. For example, when the band-like member 50 is interposed between the nozzle surface 20 and the pressing unit 56 and deforms, the error between the velocities may be absorbed by the deformation of the band-like member 50.

The first wiping is performed with a portion of the band-like member 50 that is pressed by the pressing unit 56. The pressing unit 56 presses, against the nozzle surface 20, a portion of the band-like member 50 that is located at the contact region TA. This enables the liquid attached on the nozzle surface 20 to be absorbed by the band-like member 50. The band-like member 50 that absorbs the liquid moves away from the nozzle surface 20, and is collected by the winding unit 57.

That is, in the first wiping, wiping is performed by bringing the band-like member 50 into contact with a portion of the nozzle surface 20 and gradually shifting the portion of the nozzle surface 20 against which the band-like member 50 is pressed. With the first wiping, a portion of the band-like member 50 that is brought into contact with the nozzle surface 20 is gradually changed to suppress the slip of the band-like member 50 relative to the nozzle surface 20.

Second Wiping

As illustrated in FIG. 4, the control unit 59 performs the second wiping in which the nozzle surface 20 is wiped by causing the wiper moving unit 46 to move the wiper unit 45 in a state in which the movement of the band-like member 50 by the pressing unit 56 is stopped. In the second wiping, wiping is performed at a portion of the band-like member 50 that is pressed by the pressing unit 56. During the second wiping being performed, the portion of the band-like member 50 that is pressed by the pressing unit 56 does not change.

In the second wiping, the portion of the band-like member 50 that is located at the contact region TA is caused to slip relative to the nozzle surface 20. In the second wiping, dirt attached on the nozzle surface 20 is rubbed off and removed with the band-like member 50. In the second wiping, the direction in which the wiper moving unit 46 causes the wiper unit 45 to move may be the first direction D1 or may be the second direction D2.

Operation of Embodiment

Operation of the present embodiment will be described.

The control unit 59 according to the embodiment is able to perform the first wiping and the second wiping. The first wiping and the second wiping are each wiping of the nozzle surface 20 with the band-like member 50. The first wiping and the second wiping are performed in a state in which the liquid ejecting unit 19 is stopped above the wiping device 32.

The wiper moving unit 46 causes the wiper unit 45 to move to wipe the nozzle surface 20 with the band-like member 50. The control unit 59 causes the wiper moving unit 46 to move the wiper unit 45 to perform the first wiping and the second wiping. The control unit 59 may separately perform the first wiping and the second wiping or may continuously perform the first wiping and the second wiping. For example, the control unit 59 may perform the first wiping, and then perform the second wiping.

The control unit 59 may perform the first wiping when the forced discharge is performed. The control unit 59 may perform the first wiping when the elapsed time from the wiping of the nozzle surface 20 exceeds the predetermined period of time. The control unit 59 may perform the first wiping when the amount of dirt on the nozzle surface 20 exceeds the predetermined amount.

When the forced discharge is performed, the way of wiping may be changed in accordance with the discharged liquid. For example, when the first liquid is discharged from the nozzles 21 through the forced discharge by the forced discharge unit 33, the first wiping may be performed. When the second liquid is discharged and the first liquid is not discharged from the nozzles 21 through the forced discharge by the forced discharge unit 33, the second wiping may be performed without performing the first wiping.

Effects of Embodiment

Effects of the embodiment will be described.

(1) The pressing unit 56 moves the band-like member 50 in the first direction D1. The wiper moving unit 46 moves the wiper unit 45 in the second direction D2. The second direction D2 is a direction that is opposite to the first direction D1. Thus, the band-like member 50 is moved at the first velocity while the wiper unit 45 is being moved at the first velocity, whereby it is possible to suppress rubbing between the band-like member 50 and the nozzle surface 20. This makes it possible to suppress the wear of the nozzle surface 20.

(2) The pressing unit 56 that presses the band-like member 50 rotates to move the band-like member 50. With the rotation of the pressing unit 56, the band-like member 50 moves in the first direction D1 at the first velocity. Thus, it is possible to suppress the wear of the nozzle surface 20 with a simplified configuration.

(3) After the first wiping is performed, the second wiping is performed. In the first wiping, it is possible to absorb the liquid attached on the nozzle surface 20. However, with the first wiping, foreign materials such as a dried liquid may be left on the nozzle surface 20. In the second wiping, the wiper unit 45 is moved in a state in which the movement of the band-like member 50 is stopped. That is, after the liquid that causes the wear is absorbed with the first wiping, the second wiping makes it possible to rub and remove the foreign substance left on the nozzle surface 20.

(4) When the first liquid is forcibly discharged from the nozzles 21, the first wiping is performed. As the first liquid is forcibly discharged from the nozzles 21, a large amount of the first liquid is attached on the nozzle surface 20. By performing the first wiping, it is possible to cause the band-like member 50 to absorb the first liquid.

(5) When the second liquid that does not contain any inorganic pigment is discharged, the second wiping is performed without performing the first wiping. Thus, it is possible to reduce the period of time required to wipe the nozzle surface 20, as compared with a case in which both the first wiping and the second wiping are performed.

(6) In some cases, for example, a mist that is a liquid spreading in a fog manner may be attached on the nozzle surface 20 to make it dirty. The amount of dirt attached on the nozzle surface 20 increases with the passage of time. In this regard, the first wiping is performed when the elapsed time from the wiping of the nozzle surface 20 exceeds the predetermined period of time. Thus, even when the nozzle surface 20 gets dirty, it is possible to clean the nozzle surface 20 by performing the first wiping.

(7) When the amount of dirt on the nozzle surface 20 detected by the detecting unit 61 exceeds the predetermined amount, the first wiping is performed. Thus, for example, when a mist is attached and the nozzle surface 20 gets dirty, it is possible to clean the nozzle surface 20 by performing the first wiping.

Modification Examples

The present embodiment may be modified in the following manner. The present embodiment and the modification examples described below may be implemented in combination within a range in which a technical contradiction does not arise.

The winding unit 57 may function as a moving unit configured to wind the band-like member 50 to move the band-like member 50 in the first direction D1. That is, the winding unit 57 may wind the band-like member 50, thereby moving, in the first direction D1, a portion of the band-like member 50 that is located at the contact region TA. The pressing unit 56 may be configured to be able to rotate while pressing, against the nozzle surface 20, the band-like member 50 between the feeding unit 55 and the winding unit 57. The control unit 59 may perform the first wiping by causing the winding unit 57 to move the band-like member 50 at the first velocity while causing the wiper moving unit 46 to move the wiper unit 45 in the second direction D2 at the first velocity. In this case, the nozzle surface 20 is wiped with a portion of the band-like member 50 that is pressed by the pressing unit 56. With this method, it is possible to suppress the rubbing between the band-like member 50 and the nozzle surface 20 while suppressing the wear of the nozzle surface 20 with a simplified configuration.

When the winding unit 57 moves the band-like member 50, the pressing unit 56 may rotate in a followed manner in association with the movement of the band-like member 50.

When the winding unit 57 moves the band-like member 50, the pressing unit 56 may be fixed. The winding unit 57 may move the band-like member 50 so as to slide relative to the pressing unit 56.

After performing the first wiping a plurality of times, the control unit 59 may perform the second wiping. By reducing the frequency at which the second wiping is performed, it is possible to reduce the wear of the nozzle surface 20, as compared with, for example, a case in which the first wiping is performed and then, the second wiping is performed every time.

The liquid ejecting device 11 may include a supply unit (not illustrated) configured to be able to supply the band-like member 50 with a wiping liquid. That is, the band-like member 50 may be able to wipe the nozzle surface 20 in a state of having absorbed the wiping liquid. As the band-like member 50 contains the wiping liquid, the first liquid and the second liquid are more likely to be absorbed by the band-like member 50, which makes it possible to improve the wiping performance. The wiping liquid may be contained in a portion of the band-like member 50 that is located at the contact region TA through at least one of the first wiping or the second wiping.

The wiper moving unit 46 may be configured to move the wiper unit 45 at the first velocity to perform the first wiping, and move the wiper unit 45 at a second velocity faster than the first velocity to perform the second wiping. By moving the wiper unit 45 at the first velocity slower than the second velocity to perform the first wiping, it is possible to reduce the residue of the liquid attached on the nozzle surface 20. By moving the wiper unit 45 at the second velocity faster than the first velocity to perform the second wiping, it is possible to reduce the period of time required to perform the wiping.

The force with which the pressing unit 56 presses the band-like member 50 may be variable. For example, the pressing unit 56 may press the band-like member 50 against the nozzle surface 20 with first pressing force to perform the first wiping. The pressing unit 56 may press the band-like member 50 against the nozzle surface 20 with second pressing force smaller than the first pressing force to perform the second wiping. By performing the first wiping with the first pressing force greater than the second pressing force, it is possible to reduce the residue of the liquid attached on the nozzle surface 20. By performing the second wiping with the first pressing force smaller than the first pressing force, it is possible to reduce the wear of the nozzle surface 20.

The control unit 59 may perform wiping of the nozzle surface 20 regardless of the amount of dirt on the nozzle surface 20.

The detecting unit 61 may detect the type of dirt on the nozzle surface 20. The control unit 59 may perform the first wiping and the second wiping in accordance with the type of dirt. For example, when the color of dirt is the same color as the first liquid, the control unit 59 may perform the first wiping. For example, when the color of dirt is the same color as the second liquid, the control unit 59 may perform the second wiping. When the dirt results from attachment of a mist or a liquid, the control unit 59 may perform the first wiping. For example, when the dirt on the nozzle surface 20 results from, for example, attachment of fiber or the like of the medium 15, the control unit 59 may perform the second wiping.

The control unit 59 may perform the wiping of the nozzles surface 20 regardless of the elapsed time from wiping of the nozzle surface 20.

The measuring unit 60 may measure the elapsed time that has passed since the first wiping is performed. The control unit 59 may measure the elapsed time that has passed since the second wiping is performed.

After performing the forced discharge, the control unit 59 may perform the first wiping regardless of the type of a liquid that has been forcibly discharged.

After performing the forced discharge, the control unit 59 may perform the first wiping and the second wiping regardless of the type of a liquid that has been forcibly discharged.

The forced discharge unit 33 may pressurize the liquid within the liquid ejecting unit 19 to perform the forced discharge of at least one of the first liquid or the second liquid from the nozzles 21. That is, the forced discharge unit 33 may perform pressurized cleaning to forcibly discharge the liquid from the nozzles 21.

The control unit 59 may perform the first wiping during a period of time when liquids are discharged sequentially from a plurality of nozzle groups. For example, after the first liquid is forcibly discharged from the first nozzle group G1, the control unit 59 may perform the first wiping. For example, after the second liquid is forcibly discharged from a nozzle group differing from the first nozzle group G1, the control unit 59 may perform the second wiping.

(Hereinafter, please attach "1" to the heads of all the numerical reference characters. For example, a liquid ejecting device 111, a first upstream end 124*u*, and the like. Please leave the alphabetical reference characters unchanged.)

Second Embodiment

Below, an embodiment of a liquid ejecting device and a method of controlling a liquid ejecting device will be described with reference to the drawings. The liquid ejecting device is, for example, a printer of an ink jet-type configured to eject ink serving as one example of a liquid on a medium such as a sheet, fabric, vinyl, a plastic component, a metal component, or the like.

Figure 7:
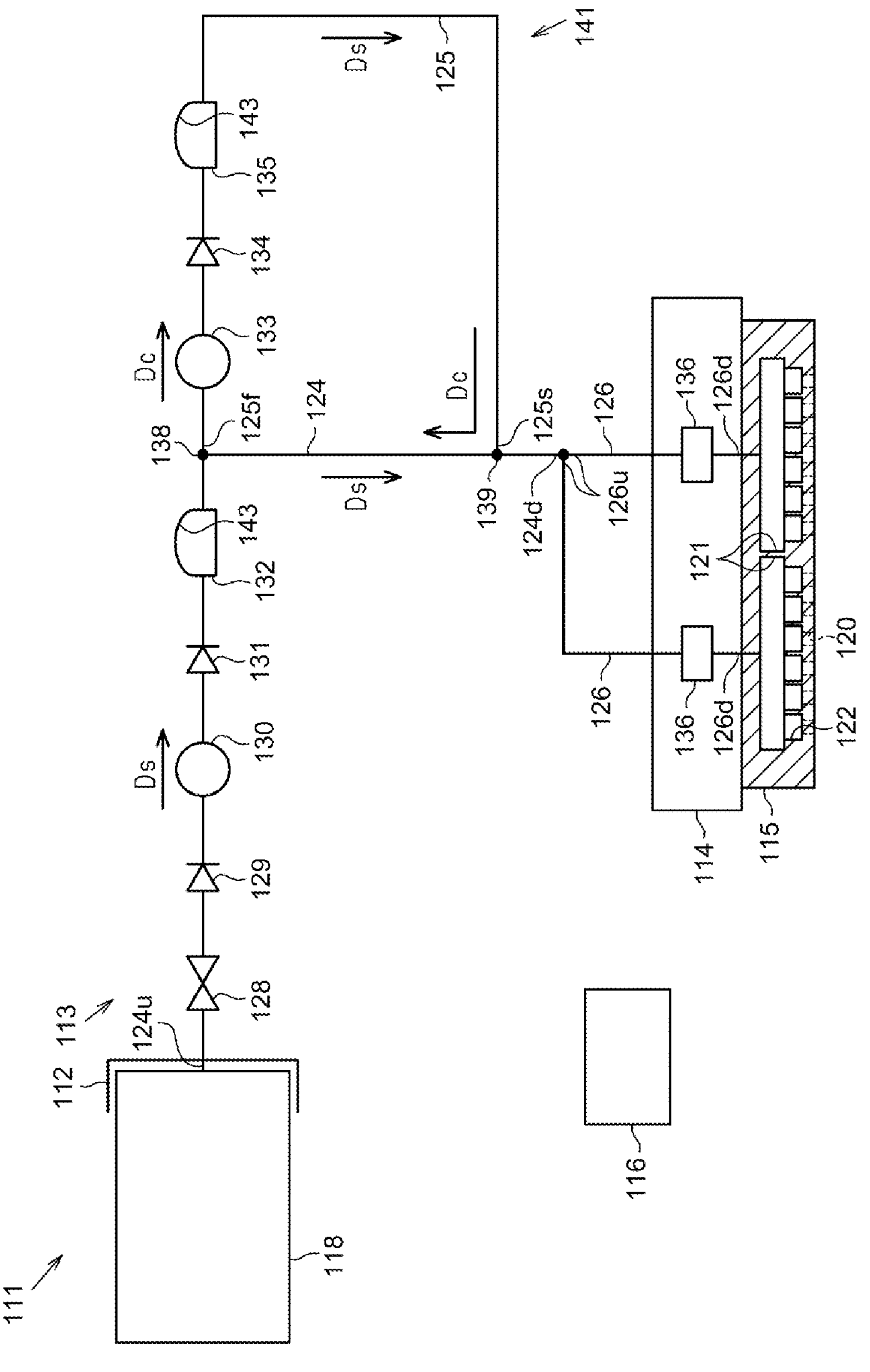
FIG. 7 is a schematic view illustrating a second embodiment of a liquid ejecting device.

As illustrated in FIG. 7, the liquid ejecting device 11 may include a mounting portion 12, a supplying mechanism 13, a holding unit 14, a liquid ejecting unit 15, and a control unit 16.

In the mounting portion 12, a liquid accommodation portion 18 configured to accommodate a liquid may be mounted in a detachable manner. When a liquid is able to be replenished in the liquid accommodation portion 18, the liquid accommodation portion 18 may be fixed to the mounting portion 12.

The holding unit 14 holds the liquid ejecting unit 15. When the liquid ejecting unit 15 is of a serial type, the holding unit 14 may be a carriage configured to reciprocate the liquid ejecting unit 15 across the medium. When the liquid ejecting unit 15 is of a line type, the holding unit 14 is configured so as to fix the liquid ejecting unit 15 so as to be disposed along the transport path of a medium.

The liquid ejecting unit 15 is able to eject a liquid. The liquid ejecting unit 15 ejects a liquid from a plurality of nozzles 20 to perform printing on a medium that is not illustrated. The liquid ejecting unit 15 includes a plurality of common liquid chambers 21 and a plurality of cavities 22. The common liquid chamber 21 temporarily stores a liquid supplied by the supplying mechanism 13. The plurality of cavities 22 are each provided so as to correspond to each of the plurality of nozzles 20. The cavities 22 each send a liquid stored in one common liquid chamber 21 among the plurality of common liquid chambers 21, to a corresponding nozzle 20.

Supplying Mechanism

The supplying mechanism 13 supplies a liquid to the liquid ejecting unit 15 from the liquid accommodation portion 18 mounted at the mounting portion 12. The supplying mechanism 13 includes a first supply flow path 24, a branch flow path 25, and a plurality of second supply flow paths 26. The supplying mechanism 13 may include an opening/closing valve 28, a third one-way valve 29, a supply pump 30, a first one-way valve 31, a first storage unit 32, a circulating liquid-delivery unit 33, a second one-way valve 34, and a second storage unit 35. The supplying mechanism 13 may include a plurality of pressure regulating valves 36.

Each of the flow paths of the first supply flow path 24, the branch flow path 25, and the plurality of second supply flow paths 26 may be configured with a tube having flexibility. Each of the flow paths may be configured with a hard member having a hole. Each of the flow paths may be configured by covering, with a film or the like, a groove formed in a hard member. Each of the flow paths may be comprised of members differing from each other. Each of the flow paths may be configured by combining a plurality of members such as a tube and a hard member, for example.

In the first supply flow path 24, a first upstream end **24*u* serving as one example of an upstream end is coupled to the liquid accommodation portion 18. The first upstream end 24*u* may be, for example, a hollow needle sticking into the liquid accommodation portion 18. The first upstream end 24*u* may be provided at the mounting portion 12. The first upstream end 24*u* is coupled to the liquid accommodation portion 18 mounted at the mounting portion 12, whereby the first supply flow path 24 is configured to be able to guide the liquid accommodated in the liquid accommodation portion 18. The first supply flow path 24 is configured to be able to supply the liquid from the upstream where the liquid accommodation portion 18 is provided toward the downstream where the liquid ejecting unit 15** is provided.

In the present embodiment, an end, at the downstream, of the first supply flow path 24 is referred to as a first downstream end **24*d*. A first connecting portion 38 and a second connecting portion 39 are provided at the first supply flow path 24. The first connecting portion 38 is provided midway in the first supply flow path 24. The first connecting portion 38 is provided between the first upstream end 24*u* and the first downstream end 24*d* in the first supply flow path 24. The second connecting portion 39 is provided downstream of the first connecting portion 38. The second connecting portion 39 according to the present embodiment is provided between the first connecting portion 38 and the first downstream end 24*d*. That is, the second connecting portion 39 according to the present embodiment is provided midway in the first supply flow path 24**.

Both ends of the branch flow path 25 are coupled to the first supply flow path 24. The branch flow path 25 includes a first end **25*f* coupled to the first connecting portion 38 and also includes a second end 25*s*, which is opposite from the first end 25*f*, coupled to the second connecting portion 39. The branch flow path 25 constitutes a circulation flow path 41 between the branch flow path 25 and the first supply flow path 24. Specifically, the first supply flow path 24 and the branch flow path 25 between the first connecting portion 38 and the second connecting portion 39 constitute the circulation flow path 41**.

The supplying mechanism 13 according to the present embodiment includes two second supply flow paths 26. The supplying mechanism 13 may include three or more second supply flow paths 26. The plurality of second supply flow paths 26 are coupled either to the branch flow path 25 between the circulating liquid-delivery unit 33 and the second connecting portion 39 or to the first supply flow path 24 at the downstream of the first connecting portion 38. In each of the second supply flow paths 26, a second upstream end **26*u* serving as one example of one end is coupled to the first downstream end 24*d* of the first supply flow path 24. In each of the second supply flow paths 26, a second downstream end 26*d* serving as one example of the other end is coupled to the liquid ejecting unit 15. The plurality of second supply flow paths 26 may each supply a liquid to a different common liquid chamber 21**.

The opening/closing valve 28 may be provided between the liquid accommodation portion 18 and the first connecting portion 38 in the first supply flow path 24. The opening/closing valve 28 may be provided between the first upstream end **24*u* and the first connecting portion 38. The opening/closing valve 28 may be, for example, an electromagnetic valve. The opening/closing valve 28 is able to switch close and open of the first supply flow path 24**.

The first one-way valve 31 and the third one-way valve 29 may be provided between the opening/closing valve 28 and the first connecting portion 38 in the first supply flow path 24. The first one-way valve 31 is provided downstream of the third one-way valve 29. The first one-way valve 31 and the third one-way valve 29 allow a liquid to flow toward the downstream in the supplying direction Ds, and restrict the flow of the liquid toward the upstream. The first one-way valve 31 and the third one-way valve 29 allow a liquid to flow from the liquid accommodation portion 18 toward the first connecting portion 38, and restrict the flow of the liquid from the first connecting portion 38 toward the liquid accommodation portion 18.

The supply pump 30 may be provided between the first one-way valve 31 and the third one-way valve 29. The supply pump 30 is, for example, a diaphragm pump. The supply pump 30 pressurizes a liquid and supplies the liquid in the supplying direction Ds from the liquid accommodation portion 18 toward the liquid ejecting unit 15.

The first storage unit 32 is able to store a liquid. The first storage unit 32 may be provided between the opening/closing valve 28 and the first connecting portion 38 in the first supply flow path 24. The first storage unit 32 according to the present embodiment is provided between the first one-way valve 31 and the first connecting portion 38.

The second storage unit 35 is able to store a liquid. The second storage unit 35 may be provided, in the branch flow path 25, downstream of the circulating liquid-delivery unit 33 in a circulating direction Dc in which the liquid circulates. The second storage unit 35 according to the present embodiment is provided between the circulating liquid-delivery unit 33 and the second connecting portion 39 in the branch flow path 25.

The first storage unit 32 and the second storage unit 35 may be each comprised of a flexible member 43 such as a film such that a portion of a wall surface is able to bend. With the first storage unit 32 being provided, it is possible to stabilize pressures of a liquid flowing in the first supply flow path 24. With the second storage unit 35 being provided, it is possible to stabilize pressures of a liquid flowing in the branch flow path 25. Thus, the first storage unit 32 and the second storage unit 35 stabilize pressures of a liquid supplied to the liquid ejecting unit 15 as well as a circulating liquid.

The circulating liquid-delivery unit 33 is provided in the branch flow path 25. The circulating liquid-delivery unit 33 is, for example, a tube pump. During driving, the circulating liquid-delivery unit 33 causes the liquid to circulate within the circulation flow path 41. When driving is stopped, the circulating liquid-delivery unit 33 is stopped in a state in which the branch flow path 25 is open. The circulating liquid-delivery unit 33 according to the present embodiment causes a liquid within the branch flow path 25 to flow from the first connecting portion 38 side to the second connecting portion 39 side. The circulating liquid-delivery unit 33 causes a liquid within the circulation flow path 41 to flow in the circulating direction Dc.

The second one-way valve 34 may be provided between the circulating liquid-delivery unit 33 and the second connecting portion 39 in the branch flow path 25. The second one-way valve 34 may be provided between the circulating liquid-delivery unit 33 and the second storage unit 35 in the branch flow path 25. The second one-way valve 34 allows a liquid directed downstream in the circulating direction Dc to flow, and restricts the flow of the liquid toward the upstream.

The pressure regulating valve 36 may be provided at the holding unit 14. The pressure regulating valve 36 may be provided at each of the plurality of second supply flow paths 26. The pressure regulating valve 36 adjust pressures of a liquid that is supplied in a pressurized manner, to stabilize the pressures of a liquid supplied to the nozzles 20. The pressure regulating valve 36 adjusts the pressures of the liquid within the liquid ejecting unit 15 so as to be a pressure at which meniscus is formed in the nozzles 20. As the liquid is ejected from the nozzles 20, the liquid within the liquid ejecting unit 15 reduces, which reduces the pressures of the liquid. The downstream of the pressure regulating valve 36 is at a predetermined negative pressure. This makes the second supply flow paths 26 opened. That is, as the liquid is consumed and the negative pressure at the downstream of the pressure regulating valve 36 increases, the pressure regulating valve 36 opens the second supply flow paths 26 to supply a liquid to the liquid ejecting unit 15.

The control unit 16 comprehensively controls driving of each mechanism in the liquid ejecting device 11, and also controls various types of operations performed in the liquid ejecting device 11.

The control unit 16 may be configured as a circuit including a: one or more processors that perform various processes according to a computer program, one or more dedicated hardware circuits that perform at least a portion of the various processes, or y: a combination thereof. The hardware circuit is, for example, an application-specific integrated circuit. The processor includes a CPU and a memory such as RAM and ROM, and the memory stores a program code or a command configured to cause the CPU to perform the process. The memory, that is, a computer readable medium includes all kinds of readable media accessible by a general purpose or dedicated computer.

Operations of Second Embodiment

Operation of the present embodiment will be described. For example, during standby in which no printing is performed, the control unit 16 may cause a liquid within the circulation flow path 41 to circulate. The control unit 16 may cause a liquid to circulate on a regular basis.

When a liquid is circulated within the circulation flow path 41, the control unit 16 causes the first supply flow path 24 to be closed by the opening/closing valve 28. The control unit 16 causes the circulating liquid-delivery unit 33 to drive to perform the circulation in a state in which the first supply flow path 24 is closed. The circulating liquid-delivery unit 33 causes the liquid within the branch flow path 25 to flow in the circulating direction Dc.

When the liquid is circulated within the circulation flow path 41, the liquid within the first supply flow path 24 is drawn into the branch flow path 25 from the first connecting portion 38. In the first supply flow path 24, the upstream of the first connecting portion 38 is closed by the opening/closing valve 28. Thus, the liquid within the first supply flow path 24 flows such that the liquid located downstream of the first connecting portion 38 flows into the branch flow path 25 from the first connecting portion 38.

The first one-way valve 31 is provided in the first supply flow path 24 and at the upstream of the first connecting portion 38. Thus, for example, even when pressures change at the first connecting portion 38, the flow of the liquid from the first connecting portion 38 to the upstream of the first supply flow path 24 is restricted by the first one-way valve 31.

The liquid flowing into the branch flow path 25 from the first connecting portion 38 passes through the second one-way valve 34 and the second storage unit 35, and flows in the circulating direction Dc. The liquid within the branch flow path 25 flows out into the first supply flow path 24 from the second connecting portion 39, and also flows in the first supply flow path 24 from the second connecting portion 39 toward the first connecting portion 38. In the first supply flow path 24, the circulating direction Dc is a reverse direction to the supplying direction Ds.

When a liquid is supplied to the liquid ejecting unit 15, the supplying mechanism 13 supplies the liquid to the liquid ejecting unit 15 through the first supply flow path 24 and the branch flow path 25. Specifically, the control unit 16 causes the circulating liquid-delivery unit 33 to stop driving and also opens the first supply flow path 24 by the opening/closing valve 28. The circulating liquid-delivery unit 33 that stops driving opens the branch flow path 25.

As the supply pump 30 sends the liquid in the supplying direction Ds, the liquid bifurcates into the first supply flow path 24 and the branch flow path 25, and flows in the supplying direction Ds. The supplying direction Ds in the branch flow path 25 is the same direction as the circulating direction Dc. The liquid passing through the first connecting portion 38 and flowing through the first supply flow path 24 and the liquid flowing into the branch flow path 25 from the first connecting portion 38 merge at the second connecting portion 39. The liquid is sent through the plurality of second supply flow paths 26 to the liquid ejecting unit 15.

Effects of Second Embodiment

Effects of the present embodiment will be described.

(1) The first one-way valve 31 is provided in the first supply flow path 24 and at the upstream of the first connecting portion 38. When driving is stopped, the circulating liquid-delivery unit 33 opens the branch flow path 25. Thus, the liquid supplied from the liquid accommodation portion 18 bifurcates into the first supply flow path 24 and the branch flow path 25 and flows. The plurality of second supply flow paths 26 couple the liquid ejecting unit 15 either to the branch flow path 25 between the circulating liquid-delivery unit 33 and the second connecting portion 39 or to the first supply flow path 24 at the downstream of the first connecting portion 38. Thus, it is possible to rapidly supply the liquid to the liquid ejecting unit 15, as compared with a case in which the liquid is supplied to the liquid ejecting unit 15 by the first supply flow path 24 and a single second supply flow path 26.

(2) The circulating liquid-delivery unit 33 causes the liquid within the branch flow path 25 to flow from the first connecting portion 38 side to the second connecting portion 39 side. That is, the circulating liquid-delivery unit 33 pulls the liquid of the first supply flow path 24 into the branch flow path 25 from the first connecting portion 38, and sends out the liquid from the second connecting portion 39 to the first supply flow path 24. Thus, it is possible to circulate the liquid with the driving of the circulating liquid-delivery unit 33.

(3) The second one-way valve 34 allows the flow of the liquid in the branch flow path 25 from the first connecting portion 38 side toward the second connecting portion 39 side. That is, the second one-way valve 34 allows the flow of the liquid from the liquid accommodation portion 18 toward the liquid ejecting unit 15. The second one-way valve 34 restricts the flow of the liquid in the branch flow path 25 from the second connecting portion 39 side toward the first connecting portion 38 side. Thus, for example, even when pulsation occurs in association with the driving of the circulating liquid-delivery unit 33, it is possible to reduce drawing the liquid into the branch flow path 25 from the second connecting portion 39.

(5) The first storage unit 32 is able to store a liquid. With the first storage unit 32 being provided in the first supply flow path 24, it is possible to reduce the fluctuation in pressures of the liquid within the first supply flow path 24.

(6) The second storage unit 35 is able to store a liquid. With the second storage unit 35 being provided downstream of the circulating liquid-delivery unit 33 in the circulating direction Dc, it is possible to reduce the fluctuation in pressures of the circulating liquid.

(7) The downstream of the pressure regulating valve 36 is at a predetermined negative pressure, which makes the second supply flow paths 26 opened. Thus, it is possible to easily adjust pressures of a liquid within the liquid ejecting unit 15 to which the second supply flow paths 26 are coupled.

Third Embodiment

Next, a third embodiment of a liquid ejecting device will be described with reference to the drawings. Note that the third embodiment differs from the second embodiment in the circulating direction. The third embodiment is substantially the same as the second embodiment in other points. Thus, the same reference characters are attached to the same components, and explanation thereof will not be repeated.

Figure 8:
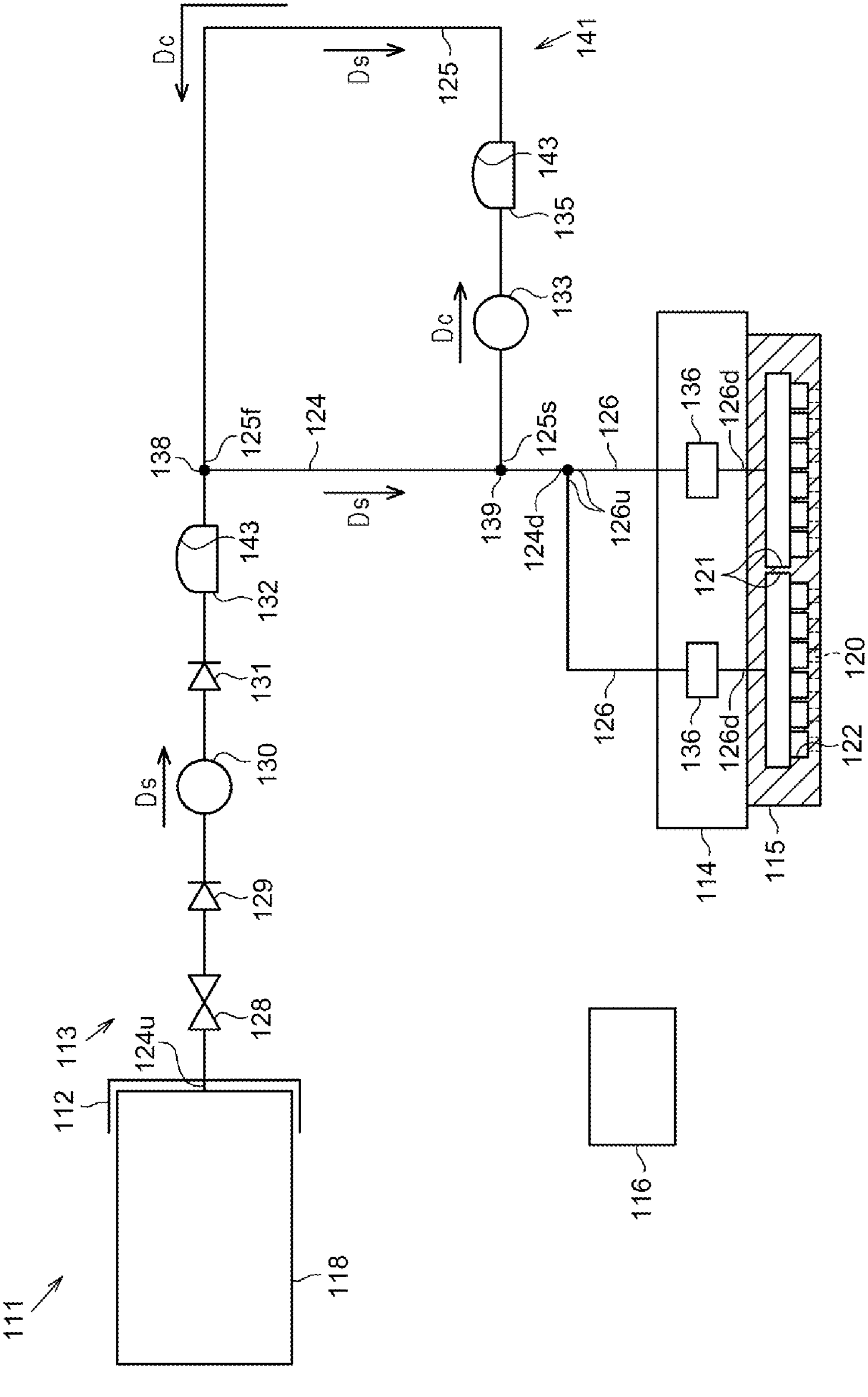
FIG. 8 is a schematic view illustrating a third embodiment of a liquid ejecting device.

As illustrated in FIG. 8, the circulating liquid-delivery unit 33 according to the present embodiment causes a liquid within the branch flow path 25 to flow from the second connecting portion 39 side to the first connecting portion 38 side. The circulating liquid-delivery unit 33 causes a liquid within the circulation flow path 41 to flow in the circulating direction Dc. The circulating direction Dc is a direction opposite to the circulating direction Dc according to the second embodiment.

In the branch flow path 25, the second storage unit 35 may be provided downstream of the circulating liquid-delivery unit 33 in the circulating direction Dc in which the liquid circulates. The second storage unit 35 according to the present embodiment is provided in the branch flow path 25 between the circulating liquid-delivery unit 33 and the first connecting portion 38.

Operations of Third Embodiment

Operation of the present embodiment will be described.

When a liquid is circulated within the circulation flow path 41, the control unit 16 causes the first supply flow path 24 to be closed by the opening/closing valve 28. The control unit 16 causes the circulating liquid-delivery unit 33 to drive to perform the circulation in a state in which the first supply flow path 24 is closed. The circulating liquid-delivery unit 33 causes the liquid within the branch flow path 25 to flow in the circulating direction Dc.

When the circulation of the liquid is performed within the circulation flow path 41, the liquid within the first supply flow path 24 is drawn into the branch flow path 25 from the second connecting portion 39. The liquid flowing into the branch flow path 25 from the second connecting portion 39 passes through the second storage unit 35, and flows in the circulating direction Dc. The liquid within the branch flow path 25 flows out into the first supply flow path 24 from the first connecting portion 38.

In the first supply flow path 24, the upstream of the first connecting portion 38 is closed by the opening/closing valve 28, and the flow of the liquid toward the liquid accommodation portion 18 is restricted by the first one-way valve 31 and the third one-way valve 29. Thus, the liquid sent from the first connecting portion 38 to the first supply flow path 24 flows toward the second connecting portion 39 in the circulating direction Dc. The circulating direction Dc in the first supply flow path 24 is the same direction as the supplying direction Ds.

When a liquid is supplied to the liquid ejecting unit 15, the supplying mechanism 13 supplies the liquid to the liquid ejecting unit 15 through the first supply flow path 24 and the branch flow path 25. Specifically, the control unit 16 causes the circulating liquid-delivery unit 33 to stop driving and also opens the first supply flow path 24 by the opening/closing valve 28. The circulating liquid-delivery unit 33 that stops driving opens the branch flow path 25.

As the supply pump 30 sends the liquid in the supplying direction Ds, the liquid bifurcates into the first supply flow path 24 and the branch flow path 25, and flows in the supplying direction Ds. The supplying direction Ds in the branch flow path 25 is a reverse direction to the circulating direction Dc. The liquid passing through the first connecting portion 38 and flowing through the first supply flow path 24 and the liquid flowing into the branch flow path 25 from the first connecting portion 38 merge at the second connecting portion 39. The liquid is sent through the plurality of second supply flow paths 26 to the liquid ejecting unit 15.

Effects of Third Embodiment

Effects of the present embodiment will be described.

(4) The circulating liquid-delivery unit 33 causes the liquid within the branch flow path 25 to flow from the second connecting portion 39 side to the first connecting portion 38 side. That is, the circulating liquid-delivery unit 33 pulls the liquid of the first supply flow path 24 into the branch flow path 25 from the second connecting portion 39, and sends out the liquid from the first connecting portion 38 to the first supply flow path 24. Thus, it is possible to circulate the liquid with the driving of the circulating liquid-delivery unit 33.

Modification Examples

The present embodiment may be modified in the following manner. The present embodiment and the modification examples described below may be implemented in combination within a range in which a technical contradiction does not arise.

The pressure regulating valve 36 may be provided in the first supply flow path 24 between the second connecting portion 39 and the first downstream end 24*d*.

For example, the pressure of a liquid within the liquid ejecting unit 15 may be adjusted on the basis of a positional relationship between the liquid accommodation portion 18 and the liquid ejecting unit 15. In this case, it may be possible to employ a configuration in which the liquid ejecting device 11 does not include the pressure regulating valve 36.

The supplying mechanism 13 may supply a liquid from the liquid accommodation portion 18 to the liquid ejecting unit 15, for example, with hydraulic head. In this case, it may be possible to employ a configuration in which the liquid ejecting device 11 does not include the supply pump 30.

The supply pump 30 may be, for example, a tube pump. The supply pump 30 may be an air supplying pump configured to deliver pressurized air to the liquid accommodation portion 18 to supply a liquid. When the supply pump 30 is a tube pump or an air supplying pump, it may be possible to employ a configuration in which the supplying mechanism 13 does not include at least one of the first one-way valve 31 or the third one-way valve 29.

At least one of the first storage unit 32 or the second storage unit 35 may be an open-type tank configured such that the inside thereof is opened to the atmosphere.

The liquid ejecting device 11 may be configured to include either one of the first storage unit 32 and the second storage unit 35. The liquid ejecting device 11 may be configured to include three or more storage units, or may be configured such that no storage unit is provided therein. The first storage unit 32 may be provided in the first supply flow path 24 and at the downstream of the first connecting portion 38.

The plurality of second supply flow paths 26 may supply a liquid to the same common liquid chamber 21. That is, one common liquid chamber 21 may be coupled to two or more second supply flow paths 26.

The second connecting portion 39 may be provided at the first downstream end 24*d* of the first supply flow path 24.

The plurality of second supply flow paths 26 may be coupled to locations differing from each other in the supplying direction Ds.

The plurality of second supply flow paths 26 may be coupled to the first supply flow path 24 between the first connecting portion 38 and the second connecting portion 39.

The plurality of second supply flow paths 26 may be coupled to the branch flow path 25 between the circulating liquid-delivery unit 33 and the second connecting portion 39.

Of the plurality of second supply flow paths 26, a portion of the second supply flow paths 26 are coupled to the branch flow path 25 between the circulating liquid-delivery unit 33 and the second connecting portion 39, and the rest of the second supply flow paths 26 are coupled to the first supply flow path 24 at the downstream of the first connecting portion 38.

The liquid ejecting device 11 may include a plurality of supplying mechanisms 13. The plurality of supplying mechanisms 13 may supply different types of liquids. The different types of liquids means, for example, inks with different colors. The liquid ejecting unit 15 may eject a plurality of types of liquids to perform color printing on a medium. The liquid ejecting device 11 may include a supplying mechanism including one first supply flow path 24 and one second supply flow path 26, in addition to the supplying mechanism 13 including the circulation flow path 41 and the plurality of second supply flow paths 26.

The liquid ejecting device 11 may be a liquid ejecting device configured to jet or eject a liquid other than ink. The state of a liquid ejected from the liquid ejecting device as a very small amount of droplet includes a particle shape, a teardrop shape, and a tail shape in a string form. The liquid as used herein may be made of any material, provided that the material can be ejected from the liquid ejecting device. For example, the liquid may be any substance, provided that the substance is in a liquid phase, and the liquid includes a fluid-form body such as a liquid-like body having high or low viscosity, sol, gel water, other inorganic solvents, an organic solvent, solution, liquid-like resin, liquid-like metal, or molten metal. The liquid includes not only a liquid as a single state of the substance, but also includes a substance in which particles of a functional material made of a solid such as pigment or metal particles are dissolved, dispersed, or mixed in a solvent, and the like. A typical example of the liquid includes the ink that has been described in the embodiments, liquid crystal, or the like. Here, the ink includes various types of liquid compositions such as general water-based ink, oil-based ink, gel ink, hot-melt ink. A specific example of the liquid ejecting device includes, for example, a liquid crystal display, an electroluminescence display, a plane-emission display, a device for ejecting a liquid containing dispersed or melted materials such as an electrode material or a color material used to manufacture a color filter. The liquid ejecting device may be a device configured to eject a biological organic material used to manufacture a biochip, a device configured to eject a liquid as a sample used as a precision pipette, a printing apparatus, or a micro dispenser. In addition, the liquid ejecting device may be a device configured to eject a lubricant by pinpoint to a precision machine such as a watch or a camera, or a device configured to eject, on a substrate, a transparent resin liquid such as a UV-curing resin in order to form a minute hemispherical lens, an optical lens, or the like used in an optical communication element or the like. Furthermore, the liquid ejecting device may be a device configured to eject an acid or alkaline etching solution used to perform etching of a substrate or the like.

Supplementary Note

Hereinafter, technical concepts as well as operation and effects thereof that are understood from the above-described embodiments and modification examples will be described.

(A) A method of controlling a liquid ejecting device provides a method of controlling a liquid ejecting device including: a liquid ejecting unit configured to eject a liquid containing an inorganic pigment from a nozzle provided at a nozzle surface; a wiper unit including a band-like member configured to absorb the liquid and a moving unit configured to move the band-like member in a first direction; and a wiper moving unit configured to move the wiper unit in a second direction opposite to the first direction to wipe the nozzle surface with the band-like member, the method including performing first wiping in which the nozzle surface is wiped by moving, by the moving unit, the band-like member at a first velocity while moving, by the wiper moving unit, the wiper unit at the first velocity.

With this method, the moving unit moves the band-like member in the first direction. The wiper moving unit moves the wiper unit in the second direction. The second direction is a direction opposite to the first direction. Thus, by moving the band-like member at the first velocity while moving the wiper unit at the first velocity, it is possible to suppress the rubbing between the band-like member and the nozzle surface. This makes it possible to suppress the wear of the nozzle surface.

(B) The method of controlling a liquid ejecting device may be configures such that the wiper unit includes a pressing unit serving as the moving unit and configured to rotate while pressing the band-like member toward the nozzle surface, to move the band-like member in the first direction, and the method includes performing the first wiping with a portion of the band-like member that is pressed by the pressing unit by moving, by the pressing unit, the band-like member at the first velocity while moving, by the wiper moving unit, the wiper unit at the first velocity.

With this method, the pressing unit that presses the band-like member rotates to move the band-like member. With the pressing unit rotating, the band-like member moves in the first direction at the first velocity. Thus, it is possible to suppress the wear of the nozzle surface with a simplified configuration.

(C) The method of controlling a liquid ejecting device may be configured such that the wiper unit includes: a feeding unit configured to hold the band-like member in a rolled state; a winding unit serving as the moving unit and configured to wind the band-like member to move the band-like member in the first direction; and a pressing unit configured to rotate while pressing, toward the nozzle surface, the band-like member between the feeding unit and the winding unit, and the method includes performing the first wiping with a portion of the band-like member that is pressed by the pressing unit by moving, by the winding unit, the band-like member at the first velocity while moving, by the wiper moving unit, the wiper unit at the first velocity.

With this method, the winding unit winds the band-like member to move the band-like member. With the rotation of the winding unit, the band-like member moves in the first direction at the first velocity. Thus, it is possible to suppress the wear of the nozzle surface with a simplified configuration.

(D) The method of controlling a liquid ejecting device may be configured such that, after performing the first wiping, the method includes performing second wiping in which the nozzle surface is wiped by moving, by the wiper moving unit, the wiper unit in a state in which movement of the band-like member by the moving unit is stopped.

With this method, after the first wiping is performed, the second wiping is performed. With the first wiping, it is possible to absorb the liquid attached on the nozzle surface. However, with the first wiping, foreign materials such as a dried liquid or the like may be left on the nozzle surface. With the second wiping, the wiper unit is moved in a state in which the movement of the band-like member is stopped. That is, after the liquid that causes the wear is absorbed in the first wiping, the second wiping makes it possible to rub and remove the foreign substance left on the nozzle surface.

(E) The method of controlling a liquid ejecting device is configured such that the liquid ejecting unit is configured to eject a first liquid that is the liquid containing the inorganic pigment and also eject a second liquid that does not contain the inorganic pigment, the liquid ejecting device further includes a forced discharge unit configured to perform forced discharge in which at least one of the first liquid or the second liquid is forcibly discharged from the nozzle, and when the first liquid is discharged from the nozzle in the forced discharge by the forced discharge unit, the first wiping is performed.

With this method, when the first liquid is forcibly discharged from the nozzle, the first wiping is performed. As the first liquid is forcibly discharged from the nozzle, a large amount of the first liquid is attached on the nozzle surface. By performing the first wiping, it is possible to cause the band-like member to absorb the first liquid.

(F) The method of controlling a liquid ejecting device is configured to include performing second wiping in which the nozzle surface is wiped by moving, by the wiper moving unit, the wiper unit in a state in which movement of the band-like member by the moving unit is stopped, and performing the second wiping without performing the first wiping when the second liquid is discharged from the nozzle through the forced discharge by the forced discharge unit and the first liquid is not discharged.

With this method, when the second liquid that does not contain an inorganic pigment is discharged, the second wiping is performed without performing the first wiping. Thus, it is possible to reduce the period of time required to wipe the nozzle surface, as compared with a case where both the first wiping and the second wiping are performed.

(G) The method of controlling a liquid ejecting device may be configured such that the liquid ejecting device further includes a measuring unit configured to measure elapsed time from wiping of the nozzle surface by the wiper unit, and when the elapsed time exceeds a predetermined period of time, the first wiping is performed.

In some cases, for example, a mist that is a liquid spreading in a fog manner may be attached on the nozzle surface to make it dirty. The amount of dirt attached on the nozzle surface 20 increases with the passage of time. In this regard, with this method, the first wiping is performed when the elapsed time from the wiping of the nozzle surface exceeds the predetermined period of time. Thus, even when the nozzle surface gets dirty, it is possible to clean the nozzle surface by performing the first wiping.

(H) The method of controlling a liquid ejecting device may be configured such that the liquid ejecting device further includes a detecting unit configured to detect the amount of dirt on the nozzle surface, and when the amount of dirt exceeds a predetermined amount, the first wiping is performed.

With this configuration, when the amount of dirt on the nozzle surface detected by the detecting unit exceeds the predetermined amount, the first wiping is performed. Thus, for example, even when a mist is attached and the nozzle surface gets dirty, it is possible to clean the nozzle surface by performing the first wiping.

(I) A liquid ejecting device includes: a liquid ejecting unit configured to eject a liquid containing an inorganic pigment from a nozzle provided at a nozzle surface; a wiper unit including a band-like member configured to absorb the liquid and a moving unit configured to move the band-like member in a first direction; a wiper moving unit configured to move the wiper unit in a second direction opposite to the first direction to wipe the nozzle surface with the band-like member; and a control unit configured to control the moving unit and the wiper moving unit, in which the control unit is configured to perform first wiping in which the nozzle surface is wiped by moving, by the moving unit, the band-like member at a first velocity while moving, by the wiper moving unit, the wiper unit at the first velocity.

With this configuration, it is possible to obtain effects similar to those of the method of controlling a liquid ejecting device.

What is claimed is:

1. A method of controlling a liquid ejecting device, the liquid ejecting device comprising:

a liquid ejecting unit configured to eject a liquid containing an inorganic pigment from a nozzle provided at a nozzle surface;

a wiper unit including a band-like member configured to absorb the liquid and a moving unit configured to move the band-like member in a first direction; and a wiper moving unit configured to move the wiper unit in a second direction opposite to the first direction to wipe the nozzle surface using the band-like member, the method comprising performing first wiping in which, to wipe the nozzle surface, the wiper moving unit moves the wiper unit in the second direction at a first velocity while the moving unit moves the band-like member in the first direction at the first velocity.

2. The method of controlling a liquid ejecting device according to claim 1, wherein the wiper unit includes a pressing unit serving as the moving unit and configured to rotate while pressing the band-like member against the nozzle surface, to move the band-like member in the first direction, and the first wiping is performed at a portion, of the band-like member, pressed by the pressing unit, and, in the first wiping, the wiper moving unit moves the wiper unit at the first velocity while the pressing unit moves the band-like member at the first velocity.

3. The method of controlling a liquid ejecting device according to claim 1, wherein the wiper unit includes:

a feeding unit configured to hold the band-like member in a rolled state;

a winding unit serving as the moving unit and configured to wind the band-like member to move the band-like member in the first direction; and a pressing unit configured to rotate while pressing, against the nozzle surface, the band-like member between the feeding unit and the winding unit, and the first wiping is performed at a portion, of the band-like member, pressed by the pressing unit and, in the first wiping, the wiper moving unit moves the wiper unit at the first velocity while the winding unit moves the band-like member at the first velocity.

4. The method of controlling a liquid ejecting device according to claim 1, wherein the method includes, after performing the first wiping, performing second wiping in which, to wipe the nozzle surface, the wiper moving unit moves the wiper unit in a state that the moving unit stops movement of the band-like member.

5. The method of controlling a liquid ejecting device according to claim 1, wherein the liquid ejecting unit is configured to eject a first liquid that is the liquid containing the inorganic pigment and a second liquid that does not contain the inorganic pigment, the liquid ejecting device further includes a forced discharge unit configured to perform forced discharge in which at least one of the first liquid or the second liquid is forcibly discharged from the nozzle, and when the forced discharge unit discharges the first liquid from the nozzle in the forced discharge, the first wiping is performed.

6. The method of controlling a liquid ejecting device according to claim 5, wherein second wiping is configured to be performed, and in the second wiping, to wipe the nozzle surface, the wiper moving unit moves the wiper unit in a state that the moving unit stops movement of the band-like member, and when the forced discharge unit discharges, in the forced discharge, the second liquid from the nozzle without discharging the first liquid, the second wiping is performed without performing the first wiping.

7. The method of controlling a liquid ejecting device according to claim 1, wherein the liquid ejecting device further includes a measuring unit configured to measure elapsed time since the wiper unit wipes the nozzle surface, and the first wiping is performed when the elapsed time exceeds a predetermined period of time.

8. The method of controlling a liquid ejecting device according to claim 1, wherein the liquid ejecting device further includes a detecting unit configured to detect an amount of dirt on the nozzle surface, and the first wiping is performed when the amount of dirt exceeds a predetermined amount.

9. A liquid ejecting device, comprising:

a liquid ejecting unit configured to eject a liquid containing an inorganic pigment from a nozzle provided at a nozzle surface;

a wiper unit including a band-like member configured to absorb the liquid and a moving unit configured to move the band-like member in a first direction;

a wiper moving unit configured to move the wiper unit in a second direction opposite to the first direction to wipe the nozzle surface using the band-like member; and a control unit configured to control the moving unit and the wiper moving unit, wherein the control unit is configured to perform first wiping in which, to wipe the nozzle surface, the wiper moving unit moves the wiper unit in the second direction at a first velocity while the moving unit moves the band-like member in the first direction at the first velocity.

* * * * *